(12) United States Patent
Piirainen et al.

(10) Patent No.: US 8,583,182 B2
(45) Date of Patent: Nov. 12, 2013

(54) DYNAMIC CELL CONFIGURATION EMPLOYING DISTRIBUTED ANTENNA SYSTEM FOR ADVANCED CELLULAR NETWORKS

(75) Inventors: Olli Juhani Piirainen, Oulu (FI); Markku Juha Vainikka, Kiviniemi (FI); Vinh Van Phan, Oulu (FI)

(73) Assignee: Nokia Siemens Networks Oy, Espoo (FI)

(*) Notice: Subject to any disclaimer, the term of this patent is extended or adjusted under 35 U.S.C. 154(b) by 0 days.

(21) Appl. No.: 12/989,286

(22) PCT Filed: Apr. 21, 2009

(86) PCT No.: PCT/EP2009/054709
§ 371 (c)(1),
(2), (4) Date: Dec. 13, 2010

(87) PCT Pub. No.: WO2009/130199
PCT Pub. Date: Oct. 29, 2009

(65) Prior Publication Data
US 2011/0105184 A1    May 5, 2011

(30) Foreign Application Priority Data
Apr. 25, 2008   (FI) ...................................... 20085375

(51) Int. Cl.
*H04M 1/00*   (2006.01)
*H04W 36/00*  (2009.01)
*H04B 1/38*   (2006.01)

(52) U.S. Cl.
USPC ......... 455/562.1; 455/443; 455/444; 455/561

(58) Field of Classification Search
USPC ......................................................... 455/562.1
See application file for complete search history.

(56) References Cited

U.S. PATENT DOCUMENTS 7,286,507 B1 *   10/2007   Oh et al. ....................... 370/334

FOREIGN PATENT DOCUMENTS

| EP | 0702 462 A1 | | 3/1996 |
| GB | 2 419 494 A | | 4/2006 |
| GB | 2419494 | * | 4/2006 |
| WO | WO-2005-120101 A1 | | 12/2005 |

* cited by examiner

*Primary Examiner* — Huy C Ho
(74) *Attorney, Agent, or Firm* — Harrington & Smith (57) ABSTRACT

A method, an apparatus and a computer program product for configuring remote antenna units with communication properties in a radio access communication system employing a distributed antenna system (DAS) are provided. The method including configuring each of the one or more remote antenna units with remote-antenna-unit-specific communication properties dynamically during communication.

38 Claims, 3 Drawing Sheets

DYNAMIC CELL CONFIGURATION EMPLOYING DISTRIBUTED ANTENNA SYSTEM FOR ADVANCED CELLULAR NETWORKS

FIELD

The invention relates to configuring remote antenna units with communication properties in a radio access communication system employing a distributed antenna system (DAS).

BACKGROUND

As requirements for the reliability and the throughput of a wireless communication are increasing, solutions and methods for providing high data rate cellular access with high quality-of-service are needed. Especially in certain environments, such as indoor environments, the transmitted data suffers from multiple penetrations before a terminal device receives it. These penetrations decrease the power of the transmitted data signal and affect the data rate and quality of the received data. Examples of such indoor propagation environments where the required data rate is high include office buildings and airport halls.

Figure 1:
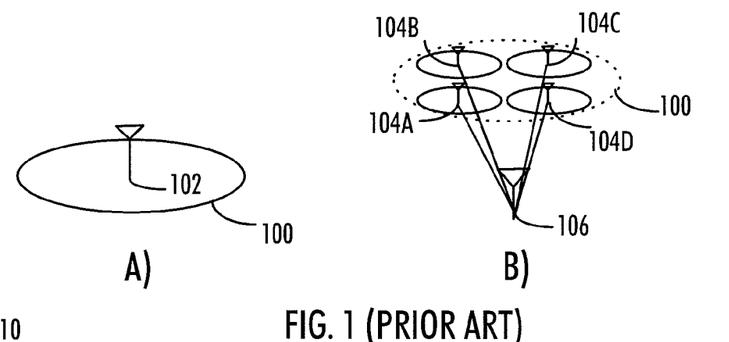
FIG. 1 shows the difference in the cell layout between a distributed antenna system and a conventional system.

It has been proposed to cover such environments with a distributed antenna system (DAS), where instead of covering an area 100 by only one base station 102 (or Node B as specified in the E-UTRAN (Evolved Universal Mobile Telecommunications System Terrestrial Radio Access Network)) as depicted in FIG. 1A, the same coverage 100 is provided by multiple remote antenna units (RAU) 104A-104D controlled by a base station 106 as illustrated in FIG. 1B. In other words, a DAS is a network where spatially separated antenna nodes or RAUs are connected to a common source via a transport medium. A DAS commonly uses a fiber cable within buildings to actively distribute signals to a network of low-power antennas. A DAS network may thus provide wireless service within a geographical area or structure. The advantages of the DAS include for example improved reliability, reduced total power, possibility of increased capacity and more frequently occurring line-of-sight (LoS) condition between the RAU and the terminal device.

Generally, when new cells or base stations are introduced to a cellular access system, they need to be configured in order to enable efficient and reliable communication between them and the terminal devices. The configuration includes, for example, providing each base station with a specific cell identifier, which may be a global cell identifier (GCID) or a physical layer cell identifier (PLCID). For example in E-UTRAN, the base station in the broadcast system information broadcasts the GCID. The PLCID, on the other hand, is an essential configuration parameter defining a cell reference signal sequence broadcast by the base station on a synchronization channel, and a mobile station identifies the base station from the signal sequence upon obtaining synchronization with the base station. In E-UTRAN the PLCID corresponds to a unique combination of one orthogonal sequence and one pseudo-random sequence, thereby resulting in a total number of 504 unique PLCIDs and expected reuse of the PLCIDs in different cell locations of a cellular radio access network. The use of identical PLCIDs by two spatially overlapping cells may cause severe identity and interference problems, which disturb the network operation.

Similarly, with the introduction of a DAS to an ITU IMT-A (International Telecommunication Union International Mobile Telecommunications-Advanced) cellular system or a similar system, such as the E-UTRAN, the activated base stations need to be configured. Since one base station controls multiple RAUs in the DAS, novel methods that enable dynamic configuration are desired.

BRIEF DESCRIPTION OF THE INVENTION

An object of the invention is to provide a method, an apparatus and a computer program product for configuring each of the one or more remote antenna units with remote-antenna-unit-specific communication properties dynamically during communication.

According to an aspect of the invention, there is provided a method as specified in claim 1.

According to another aspect of the invention, there is provided an apparatus as specified in claims 19 and 37.

According to yet another aspect of the invention, there is provided a computer-readable storage medium as specified in claim 38.

According to yet another aspect of the invention, there is provided a computer program product as specified in claim 39.

Further, embodiments of the invention are described in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations, this does not necessarily mean that each reference is made to the same embodiment(s), or that a particular feature only applies to a single embodiment. Single features of different embodiments may also be combined to provide other embodiments.

Although this invention is described using E-UTRAN as a basis, it could be applicable to any other wireless mobile communication systems as well. The E-UTRAN is also known as 3.9G or a Long Term Evolution (LTE) radio access network in the $3^{rd}$ generation partnership project (3GPP). The telecommunication system may have a fixed infrastructure providing wireless services to subscriber terminals.

The RAUs in the DAS differ from typical repeaters in that the RAUs receive the data to be transmitted commonly via an optical fiber, whereas repeaters are generally wireless. Further, the bandwidth of repeaters is limited to only one or two frequency bands due to high requirements in the amplifying of the received signal. In addition to a possible wide frequency range, the DAS also offers increased call capacity in the DAS coverage area. On the other hand, when compared to relay systems, the DAS shows to the rest of the communication network as one cell whereas the relay system may show multiple cells. This allows the DAS employment to be hidden from other cells in the radio access network. Further, relay stations are typically configured to repeat certain operations performed initially at the base station. The RAU in DAS does not repeat any actions performed at the base station.

In DAS, the transmitter power available for the base station is split among several remote antenna units. The RAUs are separated in space so that they provide coverage to the same area as the base station alone would provide. However, with several RAUs the coverage may be achieved with reduced power and increased reliability. This is because with several antennas, one can easily avoid non-line-of-sight (NLoS) situations where extra power is needed to overcome the shadowing obstacles. The DAS may also be used in transmission or reception diversity. This can be generated, for example, by separating the RAUs appropriately in space or by introducing delays between the RAUs, which increases the delay spread and allows time transmission diversity of the radio frequency signal to be employed.

Figure 2:
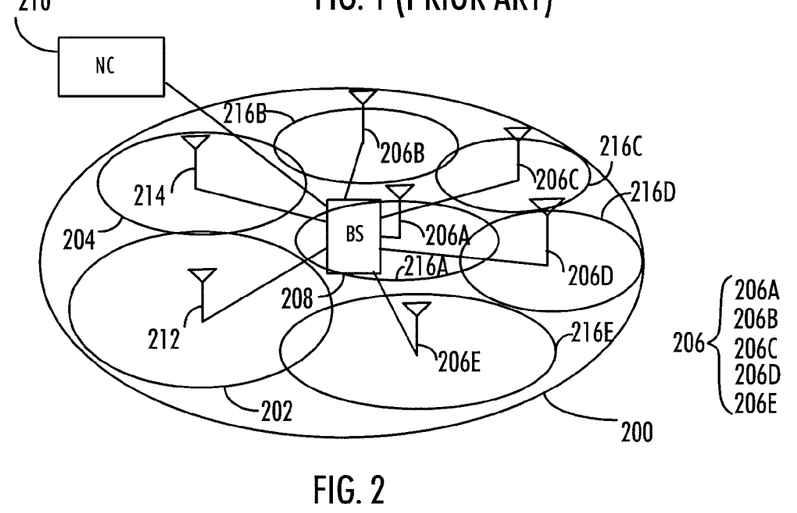
FIG. 2 illustrates a general architecture of a radio access network of a cellular telecommunication system employing a distributed antenna system.

A general architecture of a radio access network of a cellular telecommunication system employing a distributed antenna system is illustrated in FIG. 2. In the DAS, the radio coverage area of the cell covered by the DAS may be divided into one or more sub-cells. Referring to FIG. 2, which illustrates an exemplary structure of sub-cells, a cell 200 covered by the DAS is divided into three different sub-cells 202, 204 and 206. Each sub-cell is served by one or more RAUs. In other words, at least one RAU may provide coverage to each sub-cell. Consequently, the cell 200 may comprise one or more sub-cells.

In FIG. 2, one RAU 212 may serve the sub-cell 202 and RAU 214 may serve the sub-cell 204. However, the sub-cell 206 comprising five areas 206A-206E may be served by five different RAUs 216A-216E, respectively. In this case, when the coverage for the sub-cell 206 is provided by a plurality of RAUs, the RAUs may be fully synchronized in a single frequency network operation with regard to at least the cell-specific common and control channels in order to ensure reliable and efficient communication capabilities between the RAUs and the terminal device located within the sub-cell 206. The terminal device may be any user equipment such as a mobile station.

The sub-cells may send identical broadcast system information specific to the network and the cell served by the DAS. However, the different sub-cells are not required to use the one and the same frequency network for this purpose. The radio coverage areas of the sub-cells may overlap. However, in FIG. 2 this is not shown for simplicity of illustration. Further, the coverage area 200 does not need to be continuous. In other words, it may be discontinuous and consist of separate zones of offices, halls and buildings, for example. The coverage area 200 may be customized on the basis of the knowledge on the spatial distribution of users or the locations to be served within the cell 200, such as offices or halls with high density of people.

As shown in FIG. 2, a base station 208 may be part of a distributed antenna system that may comprise a plurality of remote antenna units 212-216. The base station 208 may control the RAUs 212-216. The base station 208 may be any apparatus capable of handling radio communication and controlling multiple antenna units, such as an evolved node B as in E-UTRAN. The base station 208 can communicate with other base stations over an air interface or a wired interface. The communication connection between the base stations is called an X2 interface in the specifications for E-UTRAN. Further, the base station may communicate with a network controller 210 controlling the base station via a communication connection. Thus, the network controller 210 and the base station 208 may be configured to establish a communication connection between each other. The interface between the network controller 210 and the base station 208 may be a wired interface and known as an S1 interface in the specifications for E-UTRAN. The network controller 208 may be any apparatus capable of controlling the radio communication of multiple base stations by handling the allocation of radio channels, for example. Hence the network controller 208 may be a base station controller, for example, or a similar operation and maintenance (O&M) center including servers with associated operation and maintenance tools. The O&M servers are radio resource controlling elements responsible for controlling the allocation of radio resources in radio access networks, for monitoring the performance of the radio access networks, etc.

As this invention relates to an adaptive control of the cell 200, the number of RAUs, the number of sub-cells, the coverage area of the sub-cells, the coverage area of the cell 200 need not to be static. For example, the base station 208 may control the coverage area of the cell 200 covered by the distributed antenna system dynamically by activating and/or deactivating one or more remote antenna units. By activating a RAU to provide radio communication coverage to a specific area, the overall coverage of a cell 200 may be increased. The opposite occurs if the base station 208 that may be configured to control the coverage area of the cell 200 decides to deactivate one or more of the RAUs 212-216. The term "dynamically" used here denotes that the base station may activate or deactivate one or more RAUs during the communication, if it has been determined that either an activation or deactivation of a RAU is needed. For example, the base station may decide to deactivate a particular currently activated RAU, if it has been determined that there are no users in the coverage area of that RAU. The opposite, that is the activation of a particular RAU, may be based on e.g. an advanced sensing of the base station, such as a mobility-based prediction of the movement of a terminal device from an active RAU coverage area toward a deactivated (sleeping) RAU coverage area, or it may be based on a working hour regulation scheme or cell load monitoring statistics (e.g. day-night, busy-idle hours, etc.). Further, the base station 208 may activate a particular RAU after being deactivated for a period of time.

The division of a cell into one or more sub-cells may be obtained through assignment of a cell identifier, by the base station, to a specific remote antenna unit. The cell identifier may be a physical layer (layer 1) cell identifier (PLCID), a scrambling code or a sub-cell synchronization signal sequence. This kind of cell identifier may be sent by the RAU over cell-specific downlink physical common control channel, such as a pilot channel or a synchronization channel towards user equipment. The cell identifier may correspond to a specific sub-cell and thus be called a sub-cell identifier. From the sub-cell identifier the remote antenna unit may obtain information regarding the cell, for which the RAU receiving the sub-cell identifier is configured to provide radio communication coverage. After having received the sub-cell identifier, the RAU may start to broadcast the received sub-cell identifier, i.e. to form a combination of the orthogonal sequence and the pseudo random sequence corresponding to the received sub-cell identifier, and then it may start broadcasting the signal sequence to a radio interface. However, since the RAU may be a passive element, the base station may perform the actual forming of the combination corresponding to the sub-cell identifier and the broadcasting of the sub-cell identifier.

Therefore, the base station 208 may be further configured to divide the cell covered by the distributed antenna system into one or more sub-cells by assigning different sub-cell identifiers to different groups of one or more remote antenna units. More specifically, each group of one or more remote antenna units having an identical sub-cell identifier forms one sub-cell. That is, each group of one or more remote antenna units having an identical sub-cell identifier provides coverage and radio communication services to one specific sub-cell corresponding to the received sub-cell identifier.

Thus, referring to FIG. 2, the base station 208 may have assigned one sub-cell identifier corresponding to the sub-cell 202 to the RAU 212, another sub-cell identifier to the RAU 214, and yet another sub-cell identifier to the RAUs 216A-216E. The process of assigning sub-cell identifiers according to an embodiment of the invention will now be discussed in detail.

Figure 3:
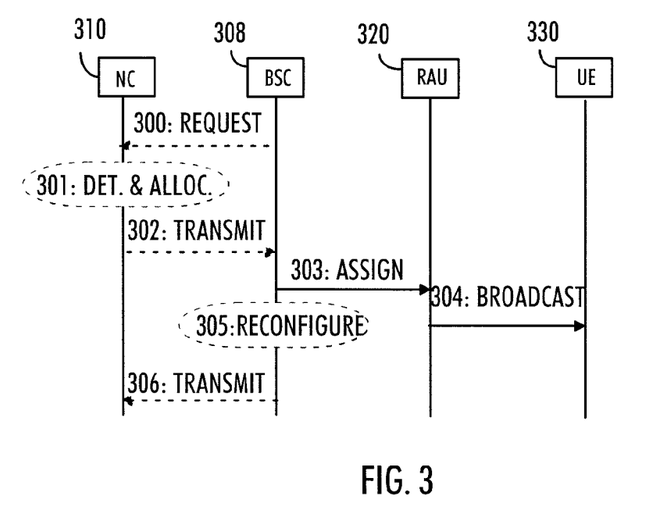
FIG. 3 shows the entities of the radio access network operating during a physical layer cell identifier assignment procedure according to an embodiment of the invention.

FIG. 3 shows how the entities of the radio access network operate during a sub-cell identifier assignment procedure according to an embodiment of the invention. In FIG. 3, the base station 308 may request 300 a set of sub-cell identifiers from the network controller 310 after having established a communication connection between the two entities. However, if the base station 308 is already equipped with a set of sub-cell identifiers upon powering up, there is no need to request the set of sub-cell identifiers from the network controller 310.

Let us consider that the request 300 for the set of sub-cell identifiers has been made. The request may contain information on the number of RAUs 320 in the distributed antenna system and the minimum number of sub-cell identifiers needed for the coverage of the cell by the DAS. That is, the base station 308 may initially determine the coverage area of the DAS and decide on the basis of the information that the cell may be divided into certain amount of sub-cells, each served by one or more remote antenna units 320 having the same sub-cell identifier. Thus, the minimum amount of the sub-cell identifiers needed may be equal to or less than the number of the RAUs 320 in the coverage area of the distributed antenna system. That is, the base station may be responsible for initially structuring the sub-cells by selecting, grouping and activating one or more RAUs.

Further, the maximum number of sub-cell identifiers assignable to the base station 308 controlling the RAUs 320 may be configured to be a network system parameter. For example, a maximum of six sub-cell identifiers may be specified as network system parameters for each base station.

After having received the request, the network controller 310 may determine at step 301 which sub-cell identifiers can be allocated to the base station on the basis of the sub-cell identifiers already allocated to neighboring base stations. As mentioned previously, the total number of sub-cell identifiers, such as PLCIDs in E-UTRAN may be 504, and therefore reuse of sub-cell identifiers is to be expected. However, the reuse cannot be performed so that two neighboring base stations apply identical sub-cell identifiers. This could lead to severe communication problems and endanger the reliability of traffic. Hence, the network controller 310 may store information about previously allocated sub-cell identifiers within a predetermined area in order to avoid allocating the same sub-cell identifiers to two base stations within the predetermined area. Consequently, the network controller 310 may determine if a specific sub-cell identifier can be allocated to the base station controlling the remote antenna units of the distributed antenna system on the basis of the sub-cell identifiers previously allocated to neighboring cells. Furthermore, the network controller 310 may be triggered to reallocate sub-cell identifiers already assigned to certain base stations if a need arises to reconfigure neighboring base stations and cells. Thus, the network controller 310 may perform reallocation of sub-cell identifiers even without a specific request from the base station 308. In this case, the network controller 310 may transmit a reconfiguration request to the base station to inform the base station that a reconfiguration process is about to take place and that the base station may need to release certain sub-cell identifiers.

After the network controller has determined the set of sub-cell identifiers that can be allocated to the base station 308 controlling the RAUs 320 of the distributed antenna system, the network controller 310 may allocate the set of sub-cell identifiers to the base station and then transmit the set of sub-cell identifiers to the base station 308 in step 302. The base station, after having received the set of sub-cell identifiers, may assign in step 303 the received sub-cell identifiers to different groups of one or more remote antenna units, wherein each group of one or more remote antenna units having identical sub-cell identifiers forms one sub-cell. For example, if the set of sub-cell identifiers comprises three different sub-cell identifiers, the base station 308 may, as shown in FIG. 2, assign one for the RAU 212, one for the RAU 214 and one for each of the RAUs 216A-D. The reader should note that if the base station is equipped with a set of sub-cell identifiers upon powering up, it may start the process of assigning the sub-cell identifiers from step 303 and skip steps 300, 301 and 302.

In step 304, the RAUs may start to broadcast the received sub-cell identifiers in the synchronization channel in order to allow the user equipment 330 to perform synchronization with the correct RAU 320. This allows the user equipment to know under which RAU and within which sub-cell it operates. Accordingly, the user equipment 330, operating within the cell covered by the DAS, sees the different sub-cells as separate cells, each having its own sub-cell identifier, whereas for the rest of the network the sub-cells show as one cell having its own global cell identifier.

In step 305, the base station 308 may decide that a reconfiguration of the sub-cell structure is needed. Here the sub-cell structure refers to the division into one or more sub-cells of the cell served by DAS. In other words, the base station 308 may decide that there is a need to re-divide the cell into one or more sub-cells. Alternatively, the base station 308 may determine that the coverage area of a specific sub-cell needs to be increased or decreased. Hence, the base station 308 may be configured to control the division of the sub-cells within the cell covered by the distributed antenna system dynamically by at least one of the following operations: by assigning a sub-cell identifier to one or more remote antenna units in order to increase the coverage area of a sub-cell corresponding to the sub-cell identifier, and by releasing an assigned sub-cell identifier from one or more remote antenna units in order to decrease the coverage area of a sub-cell corresponding to the sub-cell identifier. Further, the base station 308 may be configured to switch at least one of the activated RAUs within a sub-cell from providing coverage to a specific sub-cell to providing coverage to another sub-cell by assigning a sub-cell identifier that differs from the previously assigned sub-cell identifier to the at least one activated RAU. This way the base station 308 may add specific RAU coverage into an existing sub-cell, remove or switch the coverage from there, or form a new sub-cell.

The decision to change the assignment of the sub-cell identifiers and, therefore, the coverage area of the different sub-cells may be based on at least one of the following: the spatial user distribution among the sub-cells and the need for uplink reception diversity within a sub-cell. The spatial user distribution may refer to an observation that the number of calls associated with a sub-cell A has increased significantly from the moment when the sub-cell division and the number of RAUs serving each sub-cell was determined previously. Consequently, the base station 308 may decide to add a RAU A to provide coverage and increased call capacity for the sub-cell A by assigning to the RAU A a sub-cell identifier corresponding to the sub-cell A. On the other hand, the base station 308 may perform the opposite operation, i.e., release a sub-cell identifier from a specific RAU B, if it has been determined that the amount of active users operating under a sub-cell B, for which the RAU B is providing coverage, has decreased from the last observation time.

Alternatively, if the base station 308 determines that reception diversity from a specific sub-cell is needed due to decreased signal quality, indicated by a signal quality indicator, such as a signal-to-interference-plus-noise ratio, the base station 308 may assign a sub-cell identifier corresponding to that sub-cell to a RAU located in a position where the RAU can provide reception diversity within the specific sub-cell.

Further, the reconfiguring or restructuring may be triggered and based upon other traffic and location awareness. The base station 308 may monitor and measure the RAUs 320 in order to obtain such information. Moreover, the base station 308 may decide that an increase or a decrease in the coverage area of the cell covered by the DAS is needed or advantageous to perform. On the basis of this decision, the base station 308 may decide to assign or release a sub-cell identifier to or from one or more RAUs 320.

The base station 308 may simultaneously assign/release several sub-cell identifiers to/from several remote antenna units 320, it may assign/release one sub-cell identifier to/from several RAUs 320 or it may assign/release one sub-cell identifier to/from one RAU 320. Hence, it is clear that one sub-cell identifier, such as the PLCID, maybe assigned to many RAUs, thereby providing coverage and forming one sub-cell corresponding to that sub-cell identifier. This way the base station 308 may instruct each remote antenna unit 320 assigned with a sub-cell identifier to provide coverage for the sub-cell determined by the assigned sub-cell identifier.

In step 306, the base station 308 may transmit information to the network controller 310 regarding the released sub-cell identifiers in order to enable the network controller to allocate the released sub-cell identifiers to another base station.

The reader should note that the base station 308 may initiate the processes of steps 300-304 any time it sees that a cell reconfiguration is needed. In other words, even though there is an ongoing communication between UE 330 and the RAU 320 controlled by the base station 308, the base station 308 may determine that a reconfiguration is needed. Therefore, the base station may conduct the reconfiguration without any help from the network controller 310, or the base station 308 may request a new set of sub-cell identifiers from the network controller 310. In that case, the network controller determines, allocates and transmits a new set of sub-cell identifiers to the base station 308.

Figure 4:
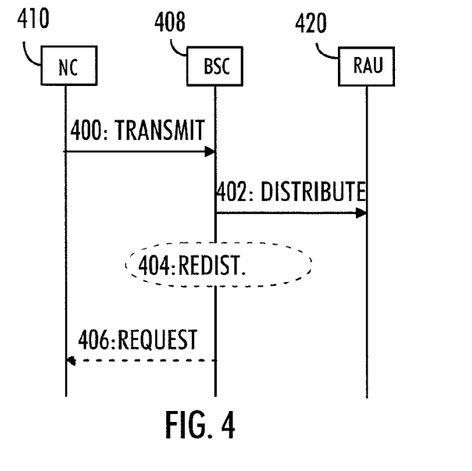
FIG. 4 illustrates the entities of the radio access network operating during a maximum allowed transmission power distribution according to an embodiment of the invention.

FIG. 4 shows how the entities of the radio access network operate during the maximum allowed transmission power distribution according to an embodiment of the invention. After the base station 408 has been powered up and the communication connection between the base station 408 and the network controller 410 has been set up, the network controller 410 may transmit in step 400 the maximum allowed transmit power (MATP) to the base station 408. That is, the network controller 410 may be configured to transmit the MATP to the base station 408 controlling the one or more remote antenna units of the distributed antenna system. The MATP may be used to assign a maximum transmit power that can be applied in the cell-specific common and control channels. The MATP may be further specified to assign a certain amount of transmit power to other channels and/or channel types. That is, the MATP may comprise a plurality of values, wherein each value denotes a maximum allowed transmit power for one or more specific communication channels.

The MATP may be used to assign a maximum transmit power that maybe applied in cell-specific common and control channels. The MATP may be further specified to assign a certain amount of transmit power to other channels and/or channel types. That is, the MATP may comprise a plurality of values, wherein each value denotes a maximum allowed transmit power for one or more specific communication channels.

The MATP may be determined based on, for example, location, coverage, and prior traffic knowledge of the area to be served by the DAS controlled by the base station 408. The MATP may be specified for the DAS cell as a regular macro-cell having the same coverage area.

In step 402, the base station 408 may distribute the received MATP to the one or more sub-cells and RAUs 420. In other words, the base station 408 may divide the received MATP to one or more RAUs providing coverage to sub-cells. When distributing the MATP, the base station 408 may take into account the discontinuity of the cell served by the DAS and the spatial user distribution among the sub-cells. That is, it may monitor the amount of traffic in each sub-cell and decide to distribute more power to the one or more RAUs 420 serving a sub-cell with high demand for communication capacity.

In step 404, the base station 408 may determine that, for example, the traffic distribution has evolved in such a way that a new distribution of the MATP is needed. Therefore, the base station may remove some of the assigned transmit power from the RAUs 420 with low traffic density and assign it to RAUs in another sub-cell with higher demand for capacity. That is, the base station may distribute the MATP dynamically, i.e. during communication, to one or more RAUs 420, according to a predetermined criterion, which may relate to the evolved spatial user distribution within the sub-cells.

Further, the base station 408 may decide that part of the received MATP is to be reserved for future needs. That is, the base station 408 is not required to distribute all of the received maximum allowed transmit power to the RAUs. However, if the base station 408 has distributed all of the MATP to the RAUs 420 and a need for an extra transmit power develops, the base station 408 may require an additional transmit power or an increased maximum allowed transmit power from the network controller 410, as shown with reference number 406. That is, the base station 408 may be configured to request an increased maximum allowed transmit power from the network controller if the base station has determined a need for increased transmission power.

Therefore, the amount of MATP transmitted to the base station 408 by the network controller 410 may be also determined based on information that the base station 408 may transmit to the network controller when requesting more transmit power in step 406.

Figure 5:
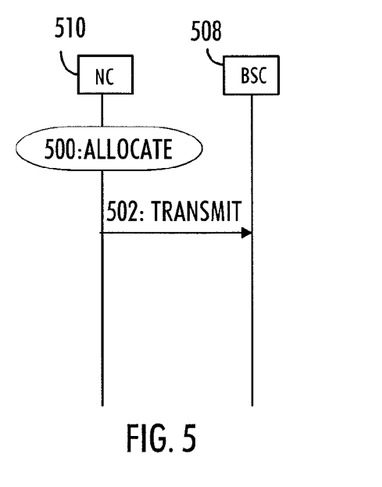
FIG. 5 illustrates the entities of the radio access network operating during a global cell identifier assignment procedure according to an embodiment of the invention.

Each cell is identified in the cellular network by a global identifier (GCID), which is unique to the base station throughout the mobile telecommunication network. The global cell identifier may be a cell identifier for higher layers, such as for a network layer (layer 3) in the open systems interconnection (OSI) basic reference model. FIG. 5 illustrates how the entities of the radio access network operate during global cell identifier assignment procedure according to an embodiment of the invention. After the base station 508 has been powered up and the communication connection between the base station 508 and the network controller 510 has been set up, the network controller 510 allocates in step 500 a single cell identifier, such as a global cell identifier (GCID), to the base station 508 controlling the remote antenna units within the coverage area of the DAS. Hence, the single GCID is allocated for the entire cell comprising all of the one or more sub-cells and RAUs serving the sub-cells. In step 502, the network controller 510 transmits the allocated GCID via the established communication connection to the base station 508. As a result, the base station 508 and the user equipment may use the sub-cell identifier coupled with the GCID to address the corresponding sub-cell within the cell served by the DAS.

Thus, the base station and the network controller may both be either directly or indirectly responsible for configuring each of the one or more remote antenna units with remote-antenna-unit-specific communication properties dynamically during communication. The remote-antenna-unit-specific communication properties comprise at least one of a cell identifier and a maximum allowed transmit power. The cell identifier may be a sub-cell specific identifier such as a scrambling code, a sub-cell synchronization signal or a physical layer cell identifier (PLCID).

Figure 6:
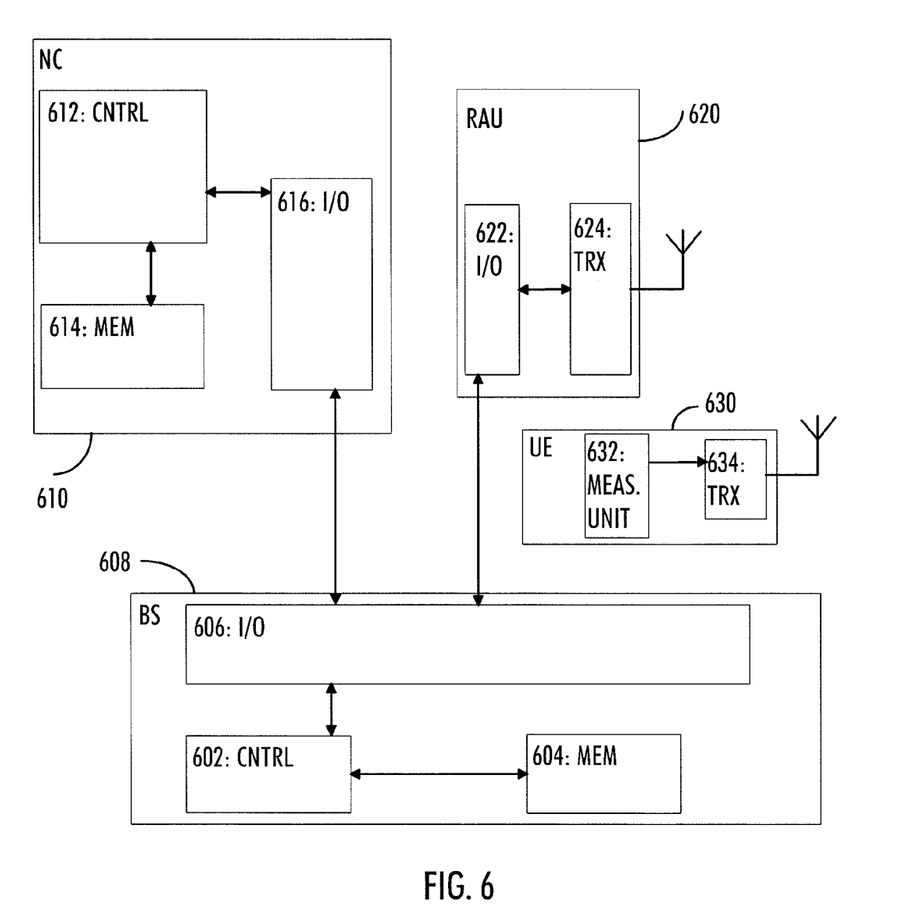
FIG. 6 shows a block diagram of a base station, network controller, remote antenna unit and user equipment according to an embodiment of the invention.

A very general architecture of the communication system according to an embodiment of the invention is shown in FIG. 6. More specifically, FIG. 6 shows a block diagram of a base station 608, network controller 610, remote antenna unit 620 and user equipment 630 according to an embodiment of the invention. The Figure shows only elements and functional entities required for understanding the embodiment. Other components have been omitted for reasons of simplicity. The implementation of the elements and functional entities may vary from that shown in FIG. 6. The connections shown in FIG. 6 are logical connections, and the actual physical connections may be different. It is apparent to a person skilled in the art that mobile telecommunication systems also comprise other functions and structures.

The base station 608 may comprise a controller 602 that may be configured to provide each of the one or more remote antenna units with remote-antenna-unit-specific communication properties dynamically during communication. The controller 602 may be responsible, for example, for assigning and releasing sub-cell identifiers, such as PLCIDs, to/from the RAUs 620, determining and reconfiguring the coverage area of the sub-cells, activating and deactivating RAUs 620 and distributing the transmission power among the RAUs 620. Further operations performed by the controller 602 are described in the claims.

The base station 608 may further comprise a memory storage 604, in which the base station 608 may store information about the maximum allowed transmit power or the cell identifiers. Further, the base station 608 may store information on the sub-cell identifiers available to be assigned to RAUs and sub-cell identifiers assigned to them.

The network controller 610 may comprise a controller 612 that may be configured to provide each of the one or more remote antenna units with remote-antenna-unit-specific communication properties dynamically during communication. The controller 602 may be responsible for allocating for example a set of cell identifiers, including a set of sub-cell identifiers and a GCID, to the base station 608 and for determining whether a specific cell identifier can be allocated to a specific base station 608.

The network controller 610 may further comprise a memory storage 614, in which the network controller 610 may store information about cell identifiers available for allocation, cell identifiers that have been allocated and cell coverage information of the base stations in a predefined area. The controller 612 may then apply this information for allocating available cell identifiers to the base stations 608.

The base station 608 and the network controller 610 may further comprise an input/output (I/O) interface 606/616 such as computer port for providing communication capabilities. The input/output interface 606/616 may perform signal-processing operations for enabling a physical channel connection, if needed. The input/output interface 606/616 may be applied for communication capabilities between the base station 608 and the network controller 610.

The remote antenna unit 620 may also comprise a similar input/output (I/O) interface 622, which can be used for communication between the RAU 620 and the base station 608. The RAU 608 may further comprise a transceiver (TRX) 624 equipped with an antenna (ANT) for providing wireless communication between the RAU 620 and the user equipment (UE) 630.

The UE 630 may also comprise a transceiver 634 equipped with an antenna for providing wireless communication between the RAU 620 and the user equipment (UE) 630. The UE 630 may further comprise a measurement unit 632 for obtaining handover-related data, which may contain information regarding the current serving sub-cell and sub-cells adjacent to the current serving sub-cell. It may further comprise the status of certain parameters. The parameters that are measured may include, but are not limited to, at least one of the following: received signal strength and CIR in the serving sub-cell as well as in the neighboring sub-cells.

FIGS. 7-10 are flow diagrams showing various embodiments according to the invention. The blocks that are marked with dashed lines in FIGS. 7 to 10 are optional and may be skipped according to an embodiment of the invention.

Figure 7:
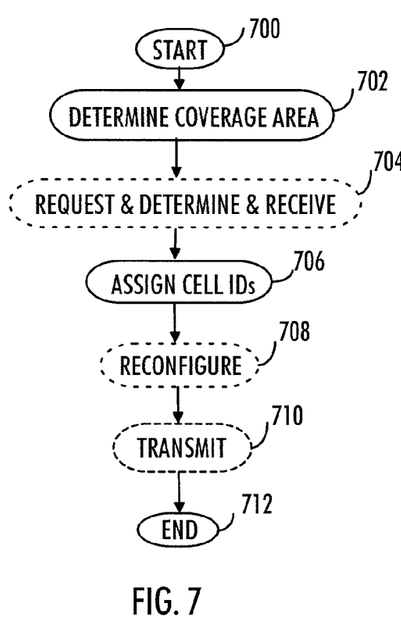
FIG. 7 depicts a flow diagram for a method of assigning the physical layer cell identifiers in the radio access network employing the distributed antenna system.

FIG. 7 illustrates a flow diagram of a method for assigning sub-cell identifiers in a radio access network employing the DAS. The method starts in step 700. In 702, the base station determines the coverage area of the cell covered by the distributed antenna system. For instance, the base station may determine that 3 sub-cells are needed: two sub-cells, where coverage is provided with one RAU in each sub-cell, and one sub-cell, where coverage is provided with 5 RAUs, as in FIG. 2. Consequently, the base station may activate the corresponding RAUs.

In step 704, if the base station is not initially equipped with a set of sub-cell identifiers, such as PLCIDs, the base station may request a set of identifiers from the network controller. The request may comprise information regarding the amount of sub-cell identifiers needed. On the basis of sub-cell identifiers assigned previously to other base stations, the network controller may determine a set of sub-cell identifiers that can be allocated to the requesting base station. The network controller may store information regarding available sub-cell identifiers, location and coverage of base stations within a predefined area of the radio access network in the memory storage of the network controller. After having determined the set of sub-cell identifiers that can be allocated to the base station, the network controller transmits the set of sub-cell identifiers via the established connection to the base station. Step 704 is optional, since if the base station is equipped with a set of sub-cell identifiers upon powering up, the base station may use those sub-cell identifiers and there is no need to request them from the network controller.

However, the network controller may be triggered to reallocate sub-cell identifiers already allocated and transmitted to certain base stations in response to a need to reconfigure neighboring base stations and cells. Thus, the network controller may perform reconfiguration of the sub-cell identifiers even without a specific request from the base station. For example, if a neighboring base station informs that new sub-cell identifiers are needed, or the network controller determines that new base stations are to be activated in the neighboring area, the network controller may need to perform reconfiguration. The reconfiguration may comprise reclaiming certain sub-cell identifiers from certain base stations or reallocating new sub-cell identifiers to certain base stations. In this case, the network controller may transmit a reconfiguration request to the base station to inform the base station that a reconfiguration process is about to take place and that the base station may need to release certain sub-cell identifiers.

In step 706 the base station assigns the sub-cell identifiers to one or more RAUs. Further, the RAU receiving the sub-cell identifiers may start to broadcast the sub-cell identifiers in order to allow the user equipment terminals within the sub-cell served by that RAU to perform synchronization with the RAU.

In step 708, the base station may reconfigure the assignment if it has been determined that new sub-cells need to be generated, the coverage area of a specific sub-cell needs to be altered or if existing sub-cells need to be removed. Consequently, the base station may assign new sub-cell identifiers to certain RAUs or remove sub-cell identifiers from certain RAUs.

In step 710, if the base station has released a sub-cell identifier from particular RAUs, the base station may transmit information to the network controller to inform the network controller that certain sub-cell identifiers are not occupied by the DAS anymore. Accordingly, the network controller may allocate those sub-cell identifiers to other base stations. The process ends in step 712.

Figure 8:
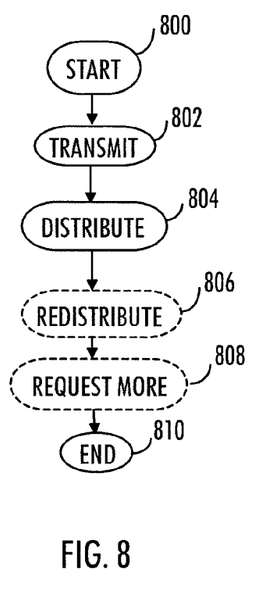
FIG. 8 depicts a flow diagram of a method for distributing the maximum allowed transmit power in the radio access network employing the distributed antenna system.

FIG. 8 illustrates a flow diagram of a method for distributing the maximum allowed transmit power (MATP) in a radio access network employing the DAS. The process starts in step 800. In step 802, the network controller determines the need for the transmit power and transmits the MATP to the base station over the established communication connection. The base station distributes the power to RAUs in step 804 after having determined how much transmit power each RAU needs. The maximum allowed transmit power can be determined individually for each channel, such as common and control channels.

If the user distribution changes from the moment of the last MATP distribution, the base station may determine that the MATP needs to be redistributed to correspond with the current spatial distribution of the users in the cell covered by the DAS. Hence, if this happens, the base station may redistribute the MATP in step 806.

Further, if extra transmit power is needed, the base station may, in step 808, require more transmit power from the network controller. For example, the base station may transmit a request to the network controller where the base station refers to the amount of transmit power needed. The network controller may determine if it is possible to allow the base station to apply that much power. Too much transmit power may cause increased inter-cell and intra-cell interference and, in order to control the amount of interference, the base station may apply location and coverage awareness that may be stored in the memory storage of the network controller before transmitting the requested amount of the MATP to the base station. The process ends in step 810.

Figure 9:
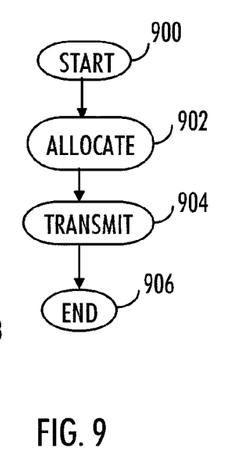
FIG. 9 shows a flow diagram of a method for assigning the global layer cell identifier in the radio access network employing the distributed antenna system.

FIG. 9 illustrates a flow diagram of a method for assigning a global cell identifier in a radio access network employing the DAS. The process starts in step 900. In step 902, the network controller allocates a global cell identifier to the base station controlling the RAUs of the DAS. In step 904, the network controller transmits the allocated GCID to the base station. The process ends in step 906.

Figure 10:
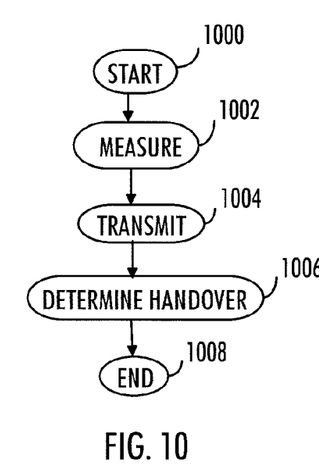
FIG. 10 illustrates a flow diagram of a method for performing handover in a radio access network employing the distributed antenna system.

FIG. 10 illustrates a flow diagram of a method for performing a handover for a terminal device from one sub-cell to another sub-cell in a radio access network employing the DAS. The process starts in step 1000. In step 1002, the terminal device may perform measurements to obtain handover related data. As explained previously, the RAU, after having received the sub-cell identifier assignment from the base station, may start to broadcast the sub-cell identifier information in the synchronization channel. Thus, the measurements of the terminal device may be based on the sub-cell identifier information received from the RAU. However, the terminal may perform measurements and monitoring of other channels and signals as well. In step 1004, the terminal device may transmit the handover related data to the base station via a remote antenna unit.

In step 1006, the base station determines whether on the basis of handover-related data received from a terminal device handover from a sub-cell to another sub-cell is needed for the terminal device in the area covered by the same distributed antenna system. If handover is needed, the terminal device may perform synchronization with the RAUs providing coverage to the target sub-cell. After this, the RAUs in the previously serving sub-cell may not offer communication capabilities to the terminal device anymore. This allows, the base station to also handle the mobility management of the terminal devices or the users within the cell covered by the DAS. The method ends in step 1008.

The embodiments of the invention presented above may be realized in an apparatus capable of dynamically configuring RAUs with remote antenna-unit-specific communication properties. The apparatus may comprise, for example, a controller, which may be configured to perform at least some of the steps described in connection with the flow diagram of FIGS. 7 to 11 and in connection with FIGS. 3 to 5.

Figure 11:
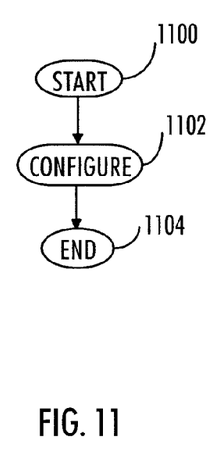
FIG. 11 illustrates a flow diagram of a method for configuring the remote antenna units with communication properties in the radio access network employing the distributed antenna system.

FIG. 11 illustrates a method for configuring the remote antenna units according to an embodiment of the invention. The method begins in step 1100. In step 1102, the apparatus, such as a base station, network controller, radio resource controller, node B, evolved node B, base station controller, radio network controller or the like, may configure each of the one or more remote antenna units with remote-antenna-unitspecific communication properties dynamically during communication. The remote-antenna-unit-specific communication properties comprise at least one of a cell identifier and a maximum allowed transmit power. The cell identifier may be, as explained, a sub-cell specific identifier such as scrambling code, a sub-cell synchronization signal or physical layer cell identifier (PLCID). The configuration may occur directly or indirectly. In direct configuration the apparatus may transmit communication properties regarding radio access control properties, sub-cell identifiers, MATP or the like to the RAU. In indirect communication, the apparatus may transmit information to the RAU via another apparatus configured to retransmit the information to each RAU. The other apparatus may process the received information before re-transmitting it. The RAUs may be configured individually, i.e. each RAU may receive different information, or they may receive identical information. The information may be sent to specific one or more RAUs only, or it may be broadcast to all RAUs. The communication properties may be configured during regular communication, i.e. even if there is an ongoing communication (traffic being transferred) between the RAUs and the UE, the apparatus may proceed with the configuration. The method ends in step 1104.

Figure 12:
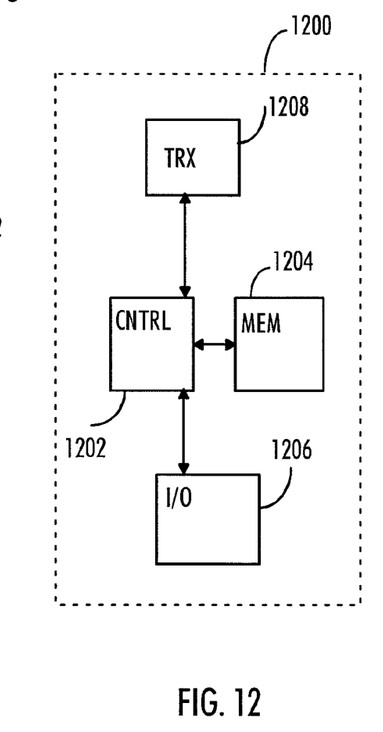
FIG. 12 shows a block diagram of an apparatus according to an embodiment of the invention.

FIG. 12 illustrates a block diagram of the apparatus according an embodiment of the invention. The Figure shows only the elements and functional entities required for understanding the embodiment. Other components have been omitted for reasons of simplicity. The implementation of the elements and functional entities may vary from that shown in FIG. 6. The connections shown in FIG. 6 are logical connections, and the actual physical connections may be different.

As mentioned above, the apparatus 1200 may comprise a controller 1202. The controller 1202 may be implemented with a digital signal processor provided with suitable software embedded on a computer readable medium, or with separate logic circuits, for example with an application-specific integrated circuit (ASIC). The controller may be configured to perform various tasks including, for example, assigning and releasing sub-cell identifiers to/from the RAUs, determining and reconfiguring the coverage area of the sub-cells, activating and deactivating RAUs, distributing the transmission power among the RAUs and handling mobility of the terminal devices. Further operations performed by the controller 1202 are described in the claims.

The apparatus 1200 may further comprise a memory storage 1204, in which the apparatus 1200 may store information regarding the maximum allowed transmit power, cell identifiers available for allocation, cell identifiers that have been allocated and cell coverage information of the base stations in a predefined area.

The apparatus 1200 may further comprise an input/output (I/O) interface 1206 such as a computer port for providing communication capabilities between different entities and logical units of the radio access network. The input/output interface 1206 may perform signal-processing operations for enabling a physical channel connection, if needed.

Further, the apparatus 1200 may comprise a transceiver (TRX) 1208. The TRX may be equipped with an antenna and, therefore, the apparatus may provide wireless air interface communication with other apparatuses, such as terminal devices, in the radio access network.

Embodiments of the invention may be implemented as computer programs in the apparatus. The computer programs comprise instructions for executing a computer process for configuring each of the one or more remote antenna units with remote-antenna-unit-specific communication properties dynamically during communication. The computer program implemented in the apparatus may carry out, but is not limited to, the tasks related to FIGS. 3 to 5 and 7 to 11.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, program storage medium, record medium, computer readable memory, random access memory, erasable programmable read-only memory, computer readable software distribution package, computer readable signal, computer readable telecommunications signal, computer readable printed matter, and computer readable compressed software package.

Even though the invention is described above with reference to an example according to the accompanying drawings, it is clear that the invention is not restricted thereto but can be modified in several ways within the scope of the appended claims.

Further, for a person skilled in the art, it is clear that the described embodiments may, but are not required to, be combined in various ways with other embodiments of the invention to further improve the performance of the radio access communication system.

The invention claimed is:

1. A method comprising:
    establishing a communication connection between a base station and a network controller controlling the base station, wherein the base station and remote antenna units controlled by the base station form a distributed antenna system and the remote antenna units are distributed within a cell covered by the distributed antenna system,
    configuring each of the one or more remote antenna units by the base station with remote-antenna-unit-specific communication properties dynamically by activating and/or deactivating said one or more remote antenna units during communication to adaptively control the remote antenna units and sub-cells covered by the remote antenna units, and
    dividing, by the base station, the cell covered by the distributed antenna system into one or more sub-cells by assigning different cell identifiers to different groups of one or more remote antenna units, wherein each group of one or more remote antenna units having an identical cell identifier forms one sub-cell.

2. The method of claim 1, wherein the remote-antenna-unit-specific communication properties comprise at least one of a cell identifier and an allowed maximum transmit power.

3. The method of claim 2, wherein the cell identifier is a physical layer cell identifier.

4. The method of claim 1, further comprising:
    controlling the coverage area of the cell covered by the distributed antenna system dynamically by activating and deactivating one or more remote antenna units.

5. The method of claim 1, further comprising:
    controlling, by the base station, the division of the sub-cells within the cell covered by the distributed antenna system dynamically by at least one of the following operations:
    assigning a cell identifier to one or more remote antenna units in order to increase the coverage area of a sub-cell corresponding to the cell identifier, and
    releasing an assigned cell identifier from one or more remote antenna units in order to decrease the coverage area of a sub-cell corresponding to the cell identifier.

6. The method of claim 5, further comprising:
determining, by the base station, the need for reconfiguring the coverage area of the different sub-cells on the basis of at least one of the following: the spatial user distribution among the sub-cells, the need for uplink reception diversity within a sub-cell, and a reconfiguration request from the network controller.

7. The method of claim 5, further comprising:
transmitting, from the base station to the network controller, information regarding the released cell identifiers over the established communication connection in order to enable the network controller to allocate the released cell identifiers to other base stations.

8. The method of claim 1, further comprising:
requesting, by the base station, from the network controller over the established communication connection a set of cell identifiers to be assigned to the one or more remote antenna units; and
receiving, by the base station, the set of cell identifiers from the network controller.

9. The method of claim 8, wherein the requesting of the set of cell identifiers from the network controller comprises:
transmitting over the established communication connection information from the base station to the network controller regarding the amount of cell identifiers needed, wherein the amount of the cell identifiers needed is equal to or less than the number of the remote antenna units in the coverage area of the distributed antenna system.

10. The method of claim 8, further comprising:
receiving, by the network controller, a request for a set of cell identifiers from the base station over the established communication connection;
allocating the set of cell identifiers to the base station; and
transmitting the set of cell identifiers from the network controller to the base station.

11. The method of claim 10, further comprising:
determining, by the network controller, if a specific cell identifier can be allocated to the base station controlling the remote antenna units of the distributed antenna system on the basis of cell identifiers previously allocated to neighboring cells.

12. The method of claim 1, further comprising:
transmitting over the established communication connection the maximum allowed transmit power from the network controller to the base station controlling the one or more remote antenna units of the distributed antenna system.

13. The method of claim 12, wherein the received maximum allowed transmit power comprises a plurality of values, wherein each value denotes a maximum allowed transmit power for one or more specific communication channels.

14. The method of claim 1, further comprising:
distributing the maximum allowed transmit power dynamically from the base station among the activated one or more remote antenna units according to a predetermined criterion.

15. The method of claim 1, further comprising:
requesting an increased maximum allowed transmit power from the network controller if the base station has determined a need for increased transmission power.

16. The method of claim 1, further comprising:
determining, by the base station, a need for handover of a terminal device from a sub-cell to another sub-cell in the area covered by the same distributed antenna system on the basis of handover-related information received from the terminal device.

17. The method of claim 1, further comprising:
requesting, by the network controller, a reconfiguration of the cell identifiers from the base station over the established communication connection if the network controller has determined that there is a need to reconfigure the cell identifiers.

18. A non-transitory computer-readable storage medium encoded with instructions that, when executed by a processor, perform the method according to claim 1.

19. A non-transitory computer program product comprising program code which, when run on a processor, executes the method according to claim 1.

20. An apparatus comprising:
an interface configured to enable a communication connection between a base station and a network controller controlling the base station, wherein the base station and remote antenna units controlled by the base station form a distributed antenna system and the remote antenna units are distributed within a cell covered by the distributed antenna system, and
a base station controller configured to configure each of the one or more remote antenna units with remote-antenna-unit-specific communication properties dynamically by activating and/or deactivating said one or more remote antenna units during communication to adaptively control the remote antenna units and sub-cells covered by the remote antenna units,
wherein the controller is further configured to divide the cell covered by the distributed antenna system into one or more sub-cells by assigning different cell identifiers to different groups of one or more remote antenna units, wherein each group of one or more remote antenna units having an identical cell identifier forms one sub-cell.

21. The apparatus of claim 20, wherein the remote-antenna-unit-specific communication properties comprise at least one of a cell identifier and an allowed maximum transmit power.

22. The apparatus of claim 21, wherein the cell identifier is a physical layer cell identifier.

23. The apparatus of claim 20, wherein the controller is further configured to:
control the coverage area of the cell covered by the distributed antenna system dynamically by activating and deactivating one or more remote antenna units.

24. The apparatus of claim 20, wherein the controller is further configured to:
control the division of the sub-cells within the cell covered by the distributed antenna system dynamically by at least one of the following operations:
assigning a cell identifier to one or more remote antenna units in order to increase the coverage area of a sub-cell corresponding to the cell identifier, and
releasing an assigned cell identifier from one or more remote antenna units in order to decrease the coverage area of a sub-cell corresponding to the cell identifier.

25. The apparatus of claim 24, wherein the controller is further configured to:
determine the need for reconfiguring the coverage area of the different sub-cells on the basis of at least one of the following: the spatial distribution of users among the sub-cells, the need for uplink reception diversity within a sub-cell, and a reconfiguration request from the network controller.

26. The apparatus of claim 24, wherein the controller is further configured to:
transmit information regarding the released cell identifiers to a network controller controlling a base station of the distributed antenna system, over the interface in order to enable the network controller to allocate the released cell identifiers to other base stations.

27. The apparatus of claim 20, wherein the controller is further configured to:
request from the network controller over the interface a set of cell identifiers to be assigned to the one or more remote antenna units; and
receive the set of cell identifiers from the network controller.

28. The apparatus of claim 27, wherein the controller is further configured to:
transmit information regarding the amount of cell identifiers needed to the network controller over the interface, wherein the amount of the cell identifiers needed is equal to or less than the number of the remote antenna units in the coverage area of the distributed antenna system.

29. The apparatus of claim 19, wherein the controller is further configured to:
receive a request for a set of cell identifiers from a base station controlling the remote antenna units of the distributed antenna system over the interface;
allocate the set of cell identifiers to the base station; and transmit the set of cell identifiers to the base station.

30. The apparatus of claim 29, wherein the controller is further configured to:
determine if a specific cell identifier can be allocated to the base station controlling the remote antenna units of the distributed antenna system on the basis of cell identifiers previously allocated to neighboring cells.

31. The apparatus of claim 19, wherein the controller is further configured to:
transmit the maximum allowed transmit power to the base station controlling the one or more remote antenna units of the distributed antenna system over the interface.

32. The apparatus of claim 31, wherein the received maximum allowed transmit power comprises a plurality of values, wherein each value denotes a maximum allowed transmit power for one or more specific communication channels.

33. The apparatus of claim 20, further comprising:
distribute the maximum allowed transmit power dynamically among the activated one or more remote antenna units according to a predetermined criterion.

34. The apparatus of claim 20, wherein the controller is further configured to:
request an increased maximum allowed transmit power from the network controller if the base station has determined a need for increased transmission power and distribute the maximum allowed transmit power dynamically among the activated one or more remote antenna units according to a predetermined criterion.

35. The apparatus of claim 20, wherein the controller is further configured to:
determine a need for handover of a terminal device from a sub-cell to another sub-cell in the area covered by the same distributed antenna system on the basis of handover-related information received from the terminal device.

36. The apparatus of claim 20 wherein the controller is further configured to:
request a reconfiguration of the cell identifiers from the base station over the interface if the network controller has determined that there is a need to reconfigure the cell identifiers and receive a request for a set of cell identifiers from a base station controlling the remote antenna units of the distributed antenna system over the interface; allocate the set of cell identifiers to the base station; and transmit the set of cell identifiers to the base station.

37. An apparatus comprising:
interface means for enabling a communication connection between a base station and a network controller controlling the base station, wherein the base station and remote antenna units controlled by the base station form a distributed antenna system and the remote antenna units are distributed within a cell covered by the distributed antenna system, and
controlling means for the base station to configure each of the one or more remote antenna units with remote-antenna-unit-specific communication properties dynamically by activating and/or deactivating said one or more remote antenna units during communication to adaptively control the remote antenna units and sub-cells covered by the remote antenna units,
wherein the controlling means divides the cell covered by the distributed antenna system into one or more sub-cells by assigning different cell identifiers to different groups of one or more remote antenna units, wherein each group of one or more remote antenna units having an identical cell identifier forms one sub-cell.

38. An apparatus comprising:
one or more processors; and
one or more memories including computer program code, the one or more memories and the computer program code configured, with the one or more processors, to cause the apparatus to perform at least the following:
establishing a communication connection between a base station and a network controller controlling the base station, wherein the base station and remote antenna units controlled by the base station form a distributed antenna system and the remote antenna units are distributed within a cell covered by the distributed antenna system,
configuring each of the one or more remote antenna units by the base station with remote-antenna-unit-specific communication properties dynamically by activating and/or deactivating said one or more remote antenna units during communication to adaptively control the remote antenna units and sub-cells covered by the remote antenna units, and
dividing, by the base station, the cell covered by the distributed antenna system into one or more sub-cells by assigning different cell identifiers to different groups of one or more remote antenna units, wherein each group of one or more remote antenna units having an identical cell identifier forms one sub-cell.

* * * * *